Dec. 24, 1968     J. J. RENTSCHLER ET AL     3,418,001

FLUID SEAL

Original Filed June 24, 1965

INVENTOR.
JOHN H. RENTSCHLER,
LEE J. URBASHICH

BY *Schroeder, Siegfried & Ryan*

ATTORNEYS

United States Patent Office 3,418,001
Patented Dec. 24, 1968

3,418,001
FLUID SEAL
John J. Rentschler, Minneapolis, and Lee J. Urbashich, Spring Park, Minn., assignors to Minnesota Rubber Company, Minneapolis, Minn., a corporation of Minnesota
Continuation of application Ser. No. 466,598, June 24, 1965. This application Nov. 1, 1967, Ser. No. 679,943
6 Claims. (Cl. 277—165)

ABSTRACT OF THE DISCLOSURE

Disclosed herein is a high pressure seal consisting of a pair of relatively movable members having movably fitted complementary working surfaces formed of metal only with a groove formed in one and defined by only metal walls with a circumferentially continuous sealing ring of generally cross-sectional U-shape positioned within the groove and with a generally rectangular relatively resilient back-up member positioned in the bottom of the groove between the legs of the sealing ring, the back-up member having concaved sides merging into convexed shaped lobes disposed at each of its corners.

---

Figure 2:
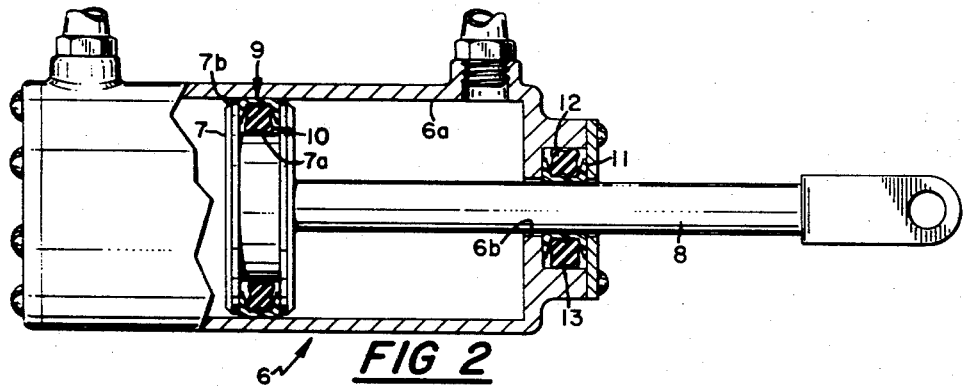

This application is a continuation of Ser. No. 466,598, filed June 24, 1965 and now abandoned.

This invention relates to sealing devices. More particularly it relates to fluid seals for relatively reciprocable members such as pistons and cylinders and piston rods and cylinder heads, as examples, and for relatively rotating members such as shafts in housings. It is particularly adapted for hydraulic and pneumatic systems and is unique in that it constitutes an improved sealing device for both high and low pressure systems. It is particularly effective, however, in high pressure systems wherein there is an increased tendency in seals heretofore known, for scrubbing, twisting or spiraling, extrusion, and a tendency to rock, cock, or twist within the groove with a consequent failure of the seal.

It has previously been discovered that the life of a sealing unit may be prolonged by utilizing a sealing ring or boot made of polytetrafluoroethylene resin, a plastic material commonly known under the trade name of "Teflon". It has been found that when a sealing ring or boot made of this material is utilized in combination with the conventional sealing ring (such as an O-ring) which serves as a backing member, the resulting sealing unit will have a prolonged useful life as compared to the useful span of life of the sealing ring if it were used alone. The material known as "Teflon" has the unusual characteristic of transferring portions of itself to a metal against which it rubs in the form of a thin film and becomes self-lubricating with very low friction and long life.

Sealing rings or boots made of "Teflon" are, as a practical matter, machined rather than molded and, as a consequence, the working or sealing surface of such sealing rings or boots are inclined to have occasional pits, burrs, minor valleys or ridges, or other irregularities in the sealing surface. These irregularities tend to diminish the effectiveness of any seal accomplished therewith. Two types of seals previously devised and utilizing "Teflon" boots of this nature are described in U.S. Patents No. 2,784,013 and No. 2,968,501. These two prior U.S. patents constitute the closest art of which the applicant is aware and each has inherent disadvantages which the instant invention is designed to overcome.

Some of the difficulties encountered and the disadvantages of the use of the standard O-ring in combination with such a "Teflon" seal are set forth in U.S. Patent No. 2,968,501. As described therein, the O-ring when used in combination with such a boot tends to wear off rapidly at the point where it seals with the bottom of the sealing groove and tends to fail completely as a result of repeated changes of direction in pressure and of consequent flow of material around the peripheral portions of the boot. These disadvantages are intensified as the pressure utilized in association therewith is increased. In addition, as the pressure is increased there is a greater tendency for the "Teflon" boot or seal to become cocked within the groove (which means that it tends to slip into the groove itself), thereby weakening or destroying the effectiveness of the seal. Also, at higher pressures there is a greater tendency for the O-ring to spiral or twist longitudinally, thereby creating great internal stresses and rapid failure of the back-up O-ring itself as well as the seal perfected thereby in combination with the "Teflon" boot or sealing ring. Moreover, with the circular cross-sectional configuration of the O-ring, it is relatively easy for the boot to turn or twist into the groove rather than to remain in sealing position against the working face opposite that within which the groove is formed.

The seal shown and claimed in U.S. Patent No. 2,968,501 while constituting an improvement over that shown in the Groen Patent No. 2,784,013, nevertheless has certain inherent disadvantages which are accentuated particularly at higher pressures and under situations where the machining of the "Teflon" boot fails to provide an ideal sealing surface because of the pits, burrs, and other irregularities therein heretofore referred to. At higher pressures the inadequacies of the "Teflon" sealing boot are multiplied because of the single sealing line or point of contact provided by the "Teflon" boot as a result of the peculiar cross-sectional configuration of its back-up ring. This is true whether an O-ring or a ring such as claimed in U.S. Patent No. 2,968,501 is utilized as the back-up member. Moreover, at extremely high pressures the flow of the resilient flowable material of the back-up ring of U.S. Patent No. 2,968,501, because of the cross-sectional configuration thereof, does not effectively preclude cocking or twisting of the "Teflon" boot into the groove for the flow of the material will take place, in part at least, in the area immediately adjacent the "Teflon" boot and tend to carry the boot with it so as to, in fact, tend to induce cocking. This flow of material, of course, will be in the direction opposite that from which the pressure is applied. Our improved seal assembly is designed to overcome these disadvantages at high pressures and, at the same time, to provide an improved seal at low pressures because of the particular cross-sectional configuration of the back-up ring which we utilize.

It is a general object of our invention to provide a novel and improved seal of simple and inexpensive construction and installation.

A more specific object is to provide a novel and improved seal which will provide an effective seal under unusually wide variations in pressure and for a prolonged period in excess of that provided by fluid seals as heretofore known.

Another object is to provide a novel and improved sealing assembly which utilizes as a component thereof a boot made of "Teflon" or similar material which has a substantially longer period of useful life span and inherently obviates some of the disadvantages thereof resulting from the method of manufacture of the boot.

Another object is to provide a novel and improved sealing assembly which utilizes a back-up member of a particular cross-sectional configuration in combination with a generally U-shaped "Teflon" boot to provide an improved seal at unusually high pressures as well as low pressures.

Figure 1:
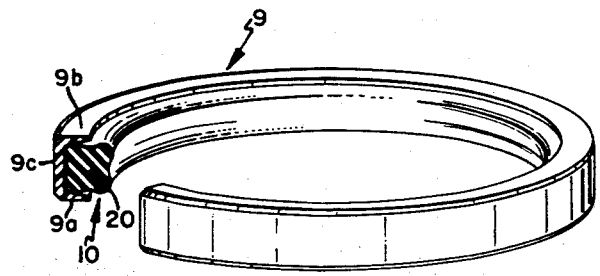
Figure 3:
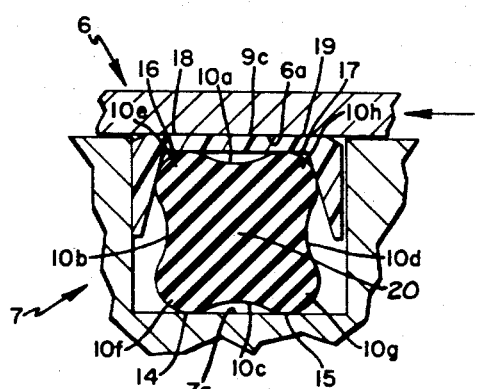
Figure 4:
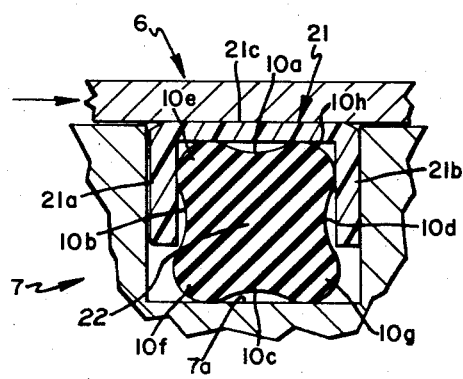

These and other objects and advantages of our invention will more fully appear from the following description made in connection with the accompanying drawings, wherein like reference characters refer to the same or similar parts throughout the several views, and in which:

FIG. 1 is a perspective view of one embodiment of our invention with a portion thereof broken away to show the seal in section;

FIG. 2 is a side elevational view, with a portion broken away to show the interior in section, of a simple two-way cylinder containing a piston connected to a piston rod which extends through an aperture in one end of the cylinder and illustrates how two forms of our invention may be utilized when the sealing groove is formed in either the inner or outer surface of a cylindrically shaped bearing surface;

FIG. 3 is a fragmentary vertical sectional view on an enlarged scale of one embodiment of our invention installed in a groove formed in one of a pair of opposed cylindrical working surfaces such as shown in FIG. 2; and FIG. 4 is a fragmentary vertical sectional view on an enlarged scale of a second embodiment of our invention installed in a groove formed in one of a pair of opposed cylindrical working surfaces such as is shown in FIG. 2.

Referring to FIG. 2, there is shown therein a simple cylinder 6 containing of piston 7 connected to a piston rod 8 which extends through an aperture in one end of the cylinder 6.

A seal is effected between the piston 7 and the wall 6a of the cylinder 6 by a "Teflon" U-shaped band or ring 9 and a rubber back-up ring 10 positioned in an annular groove 7a in the peripheral wall 7b of the piston 7. A seal is effected between the piston rod 8 and the end or head of the cylinder 6 by a similar "Teflon" ring 11 and a rubber back-up ring 12 positioned in a groove 13 in the bearing surface 6b which engages the piston rod 8. The only essential difference between the seal for the piston and the seal for the piston rod, is that in the former the groove is in an external surface and the "Teflon" ring is in the radially outer portion of the groove whereas in the piston rod seal, the groove is in an internal cylindrical surface and the "Teflon" ring is positioned in the radially inner portion of the groove. Obviously this is simply a reversal of parts. In each case the "Teflon" ring is at the opening of the groove and the rubber ring is positioned therebehind. The rings 9 and 10 when considered together and the rings 11 and 12 when considered together constitute a fluid seal positioned within the groove for perfecting a seal between the relatively movable surfaces 6a and 7b.

The problems involved in utilizing an O-ring in combination with a "Teflon" boot are set forth in considerable detail in U.S. Patent No. 2,968,501 and will not be repeated herein but reference is made to the material therein as contained in columns 3–5 inclusive of that patent, beginning at line 42 of column 3 and terminating at line 12, column 5. We have found, however, that the back-up ring having the particular cross-sectional configuration shown and claimed in U.S. Patent No. 2,968,-501, while it does have distinct advantages in some applications, still is not ideally suited for many applications and particularly for unusually low and unusually high pressures. Our invention is designed to provide an equally or even more effective seal at the usual pressures and a highly improved seal at the abnormally high or low pressures.

FIG. 1 shows in perspective the continuous "Teflon" boot or sealing ring 9 of our invention with the continuous back-up ring 10 positioned against its internal diameter surface. It will be noted that the boot 9 is generally U-shaped in cross-sectional configuration and has a pair of axially spaced edge portions comprised of radially inwardly tapering legs 9a and 9b which extend inwardly and along the sides of the back-up ring 10. The area between the legs 9a and 9b, which constitutes an intermediate sealing zone, has been identified as 9c. The sealing ring 9, as shown, is slightly narrower than the width of the groove 7a. It will be readily appreciated, by reference to FIG. 2, that when the boot 9 is to bear against an external cylindrical surface, then the boot 9 will be constructed so that the legs thereof extend radially outwardly along the sides of the back-up ring 10.

The configuration of the ring 10 is characterized by its generally square cross-section with its four sides equally concaved slightly as at 10a, 10b, 10c and 10d and defining convexly shaped lobed corner portions 10e, 10f, 10g, and 10h therebetween. The most desirable configuration of this ring is as shown and described in U.S. Tanner Patent No. 2,873,132. The back-up ring 10 is made of resilient flowable elastomeric material such as rubber throughout. The "Teflon" sealing ring 9 is made of substantially stiffer material so that ring 10 is compressed radially whenever the two rings are positioned within the groove since they are constructed so that their combined radial dimensions exceed the distance between the bottom of the groove and the opposed working surface.

FIG. 3 shows the pressure being applied from the right at relatively low levels as indicated by the arrow. As a result of the low pressure, the ring deformation is at a minimum although, of course, to effect a seal there will be some slight compression of the back-up ring 10 since the combined radial dimensions of the sealing portion of the sealing ring 9 and the back-up ring 10 in its free form always exceeds the spacing between the bottom of the groove 7a and the working surface 6a of the cylinder 6.

Two points or annular lines of sealing contact are provided at the bottom of the groove at points 14 and 15 by the two lobed corner portions 10f and 10g of the back-up ring 10. The two lobed corner portions 10e and 10h likewise provide two points or annular lines 16 and 17 of maximum pressure against the inner surface of the sealing ring 9 which is opposed to the working face 9c. As a consequence, two points or annular lines of sealing contact are provided directly opposite the two points 16 and 17 on the working surface 9c and against the surface 6a. These points or lines of sealing contact have been identified by the numerals 18 and 19.

The concavity defined by the concaved side 10c at the bottom of the groove retains hydraulic fluid therein during the operation of the cylinder and aids in maintaining adequate lubrication and the perfection of the seal at the bottom of the groove, particularly, when the pressure is alternately applied from opposite directions as in the two-way cylinder 6.

The action of the back-up ring 10 at unusually high pressures and its more favorable results is highly similar to that described above in that a double annular line of seal is perfected at the bottom of the groove and against the boot 9, with a pair of annular sealing contacts being formed between the working surfaces 9 and 6a of the boot 9 and cylinder 6, respectively. Another highly important advantage is provided at higher pressure levels, however, by the particular configuration of the back-up ring 10, for the lobes 10e and 10h maintain their same positions relative to the inner surface of the boot 9 while the main body portion 20 of the back-up ring 10 flows to the side opposite to that from which the pressure is applied. Likewise, the generally square cross-sectional configuration of the back-up ring 10 positively prevents sideways slipping or cocking of the ring 9 into the groove itself as permitted by the other back-up rings as heretofore known. The higher the pressure utilized the more firmly will the ring 10 hold the boot 9 against twisting or cocking within the groove.

It should be noted that at higher pressures, the main body 20 of the ring 10 will flow into the side concavity away from the direction from which the pressure is applied. Thus, in the situation shown in FIG. 3, at high pressures the concavity 10b will be filled and at the same time this filling material will urge the lobes 10e and 10f outwardly in a radial direction much more strongly to provide an even more perfect seal between the working surfaces 6a and 9c and to more effectively preclude cocking of the sealing ring 9 into the groove.

FIG. 4 illustrates a second embodiment of our invention wherein the back-up ring 10 is identical but the sealing ring 21 differs in its cross-sectional configuration. It will be noted that the sealing ring 21 is more pronouncedly U-shaped and that its legs 21a and 21b extend radially along the sides of the back-up ring 10 a distance in excess of one-half and approximating two-thirds of the depth of the groove. The transverse dimensions or thickness of the legs 21a and 21b exceed the thickness of the working surface or sealing zone 21c which extends between these legs. This combination is particularly well adapted for use at unusually high pressures for while all of the advantages as set forth hereinbefore resulting from the particular cross-sectional configuration of the ring 10 are obtained, in addition the unusually long radial legs 21a and 21b more effectively prevent extrusion of the rubber of the ring 10 around the legs of the sealing ring 21. This may be true because the flow of the main body portion 22 of the ring 21 toward the side away from that at which the pressure is applied presses the leg of the ring 21 at the opposite side against the side wall of the groove to more effectively prevent such extrusion.

Thus it can be seen that we have provided a better seal for use at all pressures and particularly at unusually high and low pressures. It will be seen that our seal provides a double line of sealing contact between the working surfaces at both high and low pressures. It will also be readily appreciated that our seal provides a more effective prevention of cocking or twisting of the "Teflon" sealing ring into the groove and minimizes scrubbing of the back-up ring at the bottom of the groove. Our seal also more effectively prevents extrusion of the back-up ring around the legs of the sealing ring and is much more effective in preventing spiraling or twisting of the back-up ring itself. In addition, our seal can be manufactured at reasonable cost while obtaining a considerably improved and longer wearing seal.

It will, of course, be understood that various changes may be made in the form, details, arrangement and proportions of the parts without departing from the scope of our invention which consists of the matter shown and described herein and set forth in the appended claims.

What is claimed is:
1. In a high pressure seal, the combination of:
   (a) a pair of relatively movable members havingly movably fitted complementary cylindrical working surfaces formed of metal only,
   (b) an annular groove formed at one of said surfaces and juxtaposed to the other of said surfaces and being defined by only metal walls,
   (c) a fluid seal positioned within said groove for sealing between said two movable members,
   (d) said fluid seal being comprised only of a circumferentially continuous sealing ring adapted to fit within said groove and perfect a seal against the other of said surfaces,
   (e) said sealing ring having a working face of substantially the same diameter as the other of said working surfaces and engaging the same,
   (f) a continuously formed ring-like back-up member of generally right angled polygonal cross-sectional configuration and made of a resilient flowable material throughout positioned within said groove back of said sealing ring and urging the latter against the other of said working surfaces,
   (g) the combined radial thickness of said sealing ring and said ring-like back-up member when the latter is in its free state being greater than the radial depth of said groove,
   (h) said sealing ring being of substantially stiffer material than said ring-like back-up member whereby said member is radially compressed between the bottom of the groove and the sealing ring when the seal is installed within the groove,
   (i) said sealing ring having axially spaced edge portions and an intermediate sealing zone portion of substantial width therebetween,
   (k) the inner surface of each of said edge portions intersecting the inner surface of said intermediate sealing zone portion and forming a dihedral angle therewith,
   (l) said ring-like back-up member having an inner and an outer peripheral surface, one of said surfaces of said ring-like back-up member being concavely shaped intermediate its adjacent corner portions and defining corner projecting portions bearing against said intermediate portion of said sealing ring at points adjacent its said edge portions when installed in the grove, and
   (m) the other of said peripheral surfaces in its free form being concavely shaped intermediate its adjacent corner portions and defining convexly curved corner projecting portions each bearing against the bottom of the groove and in spaced relation to the side-walls of the groove when installed and not under substantial pressure from either side.

2. The structure defined in claim 1 wherein said corner projecting portions bearing against said intermediate sealing portion of said sealing ring also engage the said edge portions thereof and the concave surface of said ring-like back-up member therebetween is in spaced relation to said intermediate zone portion whereby pressure is applied by said ring-like back-up member to said sealing ring along two axially spaced sealing lines.

3. In a high pressure seal, the combination of:
   (a) a pair of relatively movable members having movably fitted complementary cylindrical working surfaces formed of metal only,
   (b) an annular groove formed at one of said surfaces and juxtaposed to the other of said surfaces, and being defined by only metal walls,
   (c) a fluid seal positioned within said groove for sealing between said two movable members,
   (d) said fluid seal being comprised only of a circumferentially continuous sealing ring having an axial dimension slightly less than the axial dimension of said groove such that the sealing ring is adapted to move axially within the groove upon relative movement of the movable members with respect to one another,
   (e) a continuously formed ring-like back-up member of generally rectangular cross-sectional configuration and made of a resilient flowable material throughout positioned within said groove back of said sealing ring,
   (f) said sealing ring having a working face of substantially the same diameter as the other of said working surfaces and engaging the same,
   (g) the combined radial thickness of said sealing ring and said ring-like back-up member when the latter is in its free state being greater than the radial depth of said groove,
   (h) said sealing ring being made of a material having self-lubricating characteristics and being substantially stiffer than the material of said ring-like back-up member whereby said member is materially compressed between the bottom of the groove and the sealing ring when the seal is installed in the groove,
   (i) said sealing ring having axially spaced edge portions extending radially toward the bottom of said groove and an intermediate sealing zone of substantial width between said edge portions which is of substantially lesser radial thickness than its edge portions,
   (k) the inner surface of each of said edge portions intersecting the inner surface of said intermediate sealing zone portion and forming a dihedral angle therewith, (1) said ring-like back-up member having an inner and an outer peripheral surface, one of said surfaces of said ring-like back-up member being concavely shaped intermediate its adjacent corner portions and defining corner projecting portions bearing against said intermediate portions of said sealing ring at points immediately adjacent its said edge portions when installed in the groove, (m) the other of said peripheral surfaces in its free form being concavely shaped intermediate its adjacent corner portions and defining convexly curved corner projecting portions each bearing against the bottom of the groove and in spaced relation to the side-walls of the groove when installed and not under substantial pressure from either side.

4. In a high pressure seal, the combination of:
(a) a pair of relatively movable members having slidably fitted complementary cylindrical working surfaces formed of metal only,
(b) an annular groove formed at one of said surfaces and juxtaposed to the other of said surfaces and being defined by only metal walls,
(c) a fluid seal positioned within said groove for sealing between said two movable members,
(d) said fluid seal being comprised only of a circumferentially continuous sealing ring having an axial dimension only slightly less than the axial dimension of said groove such that the sealing ring is adapted to move slightly axially within the groove upon relative movement of the movable members with respect to one another,
(e) said sealing ring having a cylindrical working face complementary to and of substantially the same diameter as the other of said working surfaces and engaging the same, and
(f) a continuously formed ring-like back-up member of generally square cross-sectional configuration and made of a resilient flowable material throughout positioned within said groove back of said sealing ring,
(g) the combined radial thickness of said sealing ring and said ring-like back-up member when the latter is in its free state being greater than the radial depth of said groove,
(h) said sealing ring being made of material which is substantially stiffer than that of said ring-like back-up member and having self-lubricating characteristics whereby said member is radially compressed between the bottom of the groove and the sealing ring when the seal is installed in the groove,
(i) said sealing ring having axially spaced edge portions extending radially inwardly toward the bottom of said groove and having an intermediate sealing zone portion of substantial width between said edge portions which is of substantially lesser radial thickness than its edge portions,
(k) the inner surface of each of said edge portions intersecting the inner surface of said intermediate sealing zone portion and forming a dihedral angle therewith,
(1) said ring-like back-up member having an inner and an outer peripheral surface, one of said surfaces of said ring-like back-up member being concavely shaped intermediate its adjacent corner portions and defining corner projecting portions bearing against said intermediate portion of said sealing ring at points immediately adjacent its said edge portions when installed in the groove,
(m) the maximum axial dimensions of the back-up member being substantially less than the axial dimensions of the groove when in operative position and without pressure being applied to either side,
(n) said ring-like back-up member having opposed axially spaced concavely shaped sides cooperatively defining said corner portions with said peripheral surfaces whereby radial pressure will be applied to the corresponding corner portions of said peripheral surfaces at one side of said ring-like back-up member when fluid pressure is applied to the seal from the opposite side as a result of the resilient flowable material of the body of said ring-like member flowing into the concavity defined by the side of said ring-like back-up member opposite to the direction from which the pressure is applied.

5. The structure defined in claim 4 wherein said corner projecting portions are convexly shaped.

6. In a high pressure seal, the combination of:
(a) a pair of relatively movable members having movably fitted complementary cylindrical working surfaces formed of metal only,
(b) an annular groove formed at one of said surfaces and juxtaposed to the other of said surfaces and being defined by only metal walls,
(c) a fluid seal positioned within said groove for sealing between said two movable members,
(d) said fluid seal being comprised only of a circumferentially continuous sealing ring adapted to fit within said groove and perfect a seal against the other of said surfaces,
(e) said sealing ring having a working face of substantially the same diameter as the other of said working surfaces and engaging the same, and
(f) a continuously formed ring-like back-up member of generally right angled polygonal cross-sectional configuration and made of a resilient flowable material throughout positioned within said groove back of said sealing ring and urging the latter against the other of said working surfaces,
(g) the combined radial thickness of said sealing ring and said ring-like back-up member when the latter is in its free state being greater than the radial depth of said groove,
(h) said sealing ring being of substantially stiffer material than said ring-like back-up member whereby said member is radially compressed between the bottom of the groove and the sealing ring when the seal is installed within the groove,
(i) said sealing ring having axially spaced edge portions and an intermediate sealing zone portion of substantial width therebetween,
(k) the inner surface of each of said edge portions intersecting the inner surface of said intermediate sealing zone portion and forming a dihedral angle therewith,
(1) said ring-like back-up member having an inner and an outer peripheral surface, one of said surfaces of said ring-like back-up member being concavely shaped intermediate its adjacent corner portions and defining corner projecting portions bearing against said intermediate portion of said sealing ring at points adjacent its said edge portions when installed in the groove, and
(m) the maximum axial dimensions of the back-up member being substantially less than the axial dimensions of the groove, when in operative position and without pressure being applied to either side.

References Cited
UNITED STATES PATENTS 2,909,398   10/1959   Taylor.
2,965,421   12/1960   Zindler.
2,968,501   1/1961   Tisch.

LAVERNE D. GEIGER, *Primary Examiner.*

J. S. MEDNICK, *Assistant Examiner.*

U.S. Cl. X.R.

277—177, 206